(12) United States Patent
Takeo

(10) Patent No.: US 6,269,178 B1
(45) Date of Patent: Jul. 31, 2001

(54) METHOD AND APPARATUS FOR DETECTING PROSPECTIVE ABNORMAL PATTERNS

(75) Inventor: Hideya Takeo, Kanagawa-ken (JP)

(73) Assignee: Fuji Photo Film Co., Ltd., Kanagawa-ken (JP)

(*) Notice: Subject to any disclaimer, the term of this patent is extended or adjusted under 35 U.S.C. 154(b) by 0 days.

(21) Appl. No.: 08/927,257

(22) Filed: Sep. 11, 1997

(30) Foreign Application Priority Data

Sep. 11, 1996 (JP) ................................................ 8-240331

(51) Int. Cl.⁷ ........................................................ G06K 9/00
(52) U.S. Cl. ............................................ 382/132; 382/260
(58) Field of Search ................................ 382/128–134, 382/100, 168, 172, 181, 190, 206, 209, 218, 220, 224, 260–265, 275, 291, 270; 348/224, 290, 273, 342; 250/482.1; 283/87–89; 324/76.28; 600/76.29, 310; 363/47; 370/290, 291; 378/62

(56) References Cited

U.S. PATENT DOCUMENTS

| | | | |
|---|---|---|---|
| 4,952,807 | * 8/1990 | Adachi | 250/587 |
| 5,067,163 | * 11/1991 | Adachi | 382/132 |
| 5,086,484 | * 2/1992 | Katayama et al. | 382/270 |
| 5,212,637 | * 5/1993 | Saxena | 128/653.1 |
| 5,267,328 | * 11/1993 | Gouge | 382/128 |
| 5,448,654 | * 9/1995 | Katayama et al. | 382/298 |
| 5,481,623 | * 1/1996 | Hara | 382/128 |
| 5,703,971 | * 12/1997 | Asimopoulos et al. | 382/282 |
| 5,768,441 | * 6/1998 | Yoshizawa et al. | 382/270 |
| 5,784,482 | * 7/1998 | Nakejima | 382/132 |
| 5,784,496 | * 7/1998 | Mantell | 382/237 |
| 5,796,876 | * 8/1998 | Wang et al. | 382/270 |
| 5,807,256 | * 9/1998 | Taguchi et al. | 600/425 |

OTHER PUBLICATIONS

"Detection of Tumor Patterns in DR Images (Iris Filter)", Obata, et al., Collected Papers of the Institute of Electronics and Communications Engineers of Japan, D–II, vol. J75–D–II, No. 3, pp. 663–670, Mar. 1992.

* cited by examiner

Primary Examiner—Jayanti K. Patel
(74) Attorney, Agent, or Firm—Sughrue, Mion, Zinn, Macpeak & Seas, PLLC

(57) ABSTRACT

Iris filter processing is carried out on an image signal, which has been obtained by reading out a radiation image of an object. An output value of the iris filter processing and a predetermined threshold value are compared with each other. In the comparison, the threshold value is decreased as an image signal value, which represents a picture element subjected to the iris filter processing, becomes small. A prospective abnormal pattern, which is embedded in the radiation image, is extracted in accordance with the results of the comparison. The prospective abnormal pattern is thus detected accurately such that considerable time and labor may not be required for a person, who views a radiation image, to make a judgment.

6 Claims, 9 Drawing Sheets

FIG. 8

| $f_7$ | $f_6$ | $f_5$ | $f_4$ | $f_3$ |
|---|---|---|---|---|
| $f_8$ | | | | $f_2$ |
| $f_9$ | | | | $f_1$ |
| $f_{10}$ | | | | $f_{16}$ |
| $f_{11}$ | $f_{12}$ | $f_{13}$ | $f_{14}$ | $f_{15}$ |

PICTURE ELEMENT j

METHOD AND APPARATUS FOR DETECTING PROSPECTIVE ABNORMAL PATTERNS

BACKGROUND OF THE INVENTION

1. Field of the Invention

This invention relates to a method and apparatus for detecting a prospective abnormal pattern, typically a tumor pattern, which is embedded in a radiation image.

2. Description of the Prior Art

Image processing, such as gradation processing or frequency processing, has heretofore been carried out on an image signal, which represents an image and has been obtained with one of various image obtaining methods, such that a visible image having good image quality can be reproduced and used as an effective tool in, particularly, the accurate and efficient diagnosis of an illness. Particularly, in the field of medical images, such as radiation images of human bodies serving as objects, it is necessary for specialists, such as doctors, to make an accurate diagnosis of an illness or an injury of the patient in accordance with the obtained image. Therefore, it is essential to carry out the image processing in order that a visible image having good image quality can be reproduced and used as an effective tool in the accurate and efficient diagnosis of an illness.

In such image processing, the processing is often carried out on the entire area of the image. Alternatively, in cases where the purpose of examination or diagnosis is clear to a certain extent, the emphasis processing is often carried out selectively on a desired image portion, which is adapted to the purpose of examination or diagnosis.

Ordinarily, when an image portion to be processed is to be selected, the person, who views the radiation image, views the original image before being processed and manually selects the image portion to be processed. However, there is the risk that the selected image portion or the specified image range will vary, depending upon the level of the experience or the image understanding capability of the person, who views the radiation image, and the selection cannot be carried out objectively.

For example, in cases where a radiation image has been recorded for the examination of breast cancer, it is necessary to find a tumor pattern, which is one of features of a cancerous portion, from the radiation image. However, the range of the tumor pattern cannot always be specified accurately. Therefore, there is a strong demand for techniques for accurately detecting an abnormal pattern, such as a tumor pattern, without depending upon the skill of the person, who views the radiation image.

As one of the techniques for satisfying the aforesaid demand, iris filter processing (hereinbelow often referred to as the operation of the iris filter) has heretofore been proposed. [Reference should be made to "Detection of Tumor Patterns in DR Images (Iris Filter)," Obata, et al., Collected Papers of The Institute of Electronics and Communication Engineers of Japan, D-II, Vol. J75-D-II, No.3, pp. 663–670, March 1992.] The iris filter processing has been studied as a technique efficient for detecting, particularly, a tumor pattern, which is one of characteristic forms of mammary cancers. However, the image to be processed with the iris filter is not limited to the tumor pattern in a mammogram, and the iris filter processing is applicable to any kind of image portion having the characteristics such that the gradients of the image signal (the image density, or the like) representing the image are centralized.

How the processing for detecting a prospective abnormal pattern with the iris filter is carried out will be described hereinbelow by taking the processing for the detection of the tumor pattern as an example.

It has been known that, for example, in a radiation image recorded on X-ray film (i.e., an image yielding an image signal of a high signal level for a high image density), the image density values of a tumor pattern are slightly smaller than the image density values of the surrounding image areas. The image density values of the tumor pattern are distributed such that the image density value becomes smaller from the periphery of an approximately circular tumor pattern toward the center point of the tumor pattern. Thus the distribution of the image density values of the tumor pattern has gradients of the image density values. Therefore, in the tumor pattern, the gradients of the image density values can be found in local areas, and the gradient lines (i.e., gradient vectors) centralize in the directions heading toward the center point of the tumor pattern.

The iris filter calculates the gradients of image signal values, which are represented by the image density values, as gradient vectors and feeds out the information representing the degree of centralization of the gradient vectors. With the iris filter processing, a tumor pattern is detected in accordance with the degree of centralization of the gradient vectors.

Specifically, by way of example, as illustrated in FIG. 7A, a tumor pattern P1 may be embedded in a mammogram P. As illustrated in FIG. 7B, the gradient vector at an arbitrary picture element in the tumor pattern P1 is directed to the vicinity of the center point of the tumor pattern P1. On the other hand, as illustrated in FIG. 7C, in an elongated pattern P2, such as a blood vessel pattern or a mammary gland pattern, gradient vectors do not centralize upon a specific point. Therefore, the distributions of the directions of the gradient vectors in local areas may be evaluated, and a region, in which the gradient vectors centralize upon a specific point, may be detected. The thus detected region may be taken as a prospective tumor pattern, which is considered as being a tumor pattern. As illustrated in FIG. 7D, in a pattern P3, in which elongated patterns, such as mammary gland patterns, intersect each other, gradient vectors are liable to centralize upon a specific point. Therefore, the pattern P3 may be detected as a false positive. The processing with the iris filter is based on such fundamental concept. Steps of algorithms of the iris filter will be described hereinbelow.

(Step 1) Calculation of Gradient Vectors

For each picture element j among all of the picture elements constituting a given image, the direction $\theta$ of the gradient vector of the image signal representing the image is calculated with Formula (1) shown below.

$$\theta = \tan^{-1} \frac{(f_3 + f_4 + f_5 + f_6 + f_7) - (f_{11} + f_{12} + f_{13} + f_{14} + f_{15})}{(f_1 + f_2 + f_3 + f_{15} + f_{16}) - (f_7 + f_8 + f_9 + f_{10} + f_{11})} \quad (1)$$

As illustrated in FIG. 8, $f_1$ through $f_{16}$ in Formula (1) represent the picture element values (i.e., the image signal values) corresponding to the picture elements located at the peripheral areas of a mask, which has a size of five picture elements (located along the column direction of the picture element array) x five picture elements (located along the row direction of the picture element array) and which has its center at the picture element j.

(Step 2) Calculation of the Degree of Centralization of Gradient Vectors

Thereafter, for each picture element among all of the picture elements constituting the given image, the picture element is taken as a picture element of interest, and the degree of centralization C of the gradient vectors with respect to the picture element of interest is calculated with Formula (2) shown below.

$$C = (1/N) \sum_{j=1}^{N} \cos\theta_j \quad (2)$$

As illustrated in FIG. 9, in Formula (2), N represents the number of the picture elements located in the region inside of a circle, which has its center at the picture element of interest and has a radius R, and θj represents the angle made between the straight line, which connects the picture element of interest and each picture element j located in the circle, and the gradient vector at the picture element j, which gradient vector has been calculated with Formula (1). Therefore, in cases where the directions of the gradient vectors of the respective picture elements j centralize upon the picture element of interest, the degree of centralization C represented by Formula (2) takes a large value.

The gradient vector of each picture element j, which is located in the vicinity of a tumor pattern, is directed approximately to the center portion of the tumor pattern regardless of the level of the contrast of the tumor pattern. Therefore, it can be regarded that the picture element of interest associated with the degree of centralization C, which takes a large value, is the picture element located at the center portion of the tumor pattern. On the other hand, in a linear pattern, such as a blood vessel pattern, the directions of the gradient vectors are biased to a certain direction, and therefore the value of the degree of centralization C is small. Accordingly, a tumor pattern can be detected by taking each of all picture elements, which constitute the image, as the picture element of interest, calculating the value of the degree of centralization C with respect to the picture element of interest, and rating whether the value of the degree of centralization C is or is not larger than a predetermined threshold value. Specifically, the processing with the iris filter has the features over an ordinary difference filter in that the processing with the iris filter is not apt to be adversely affected by blood vessel patterns, mammary gland patterns, or the like, and can efficiently detect tumor patterns.

In actual processing, such that the detection performance unaffected by the sizes and shapes of tumor patterns may be achieved, it is contrived to adaptively change the size and the shape of the filter. FIG. 10 shows an example of the filter. The filter is different from the filter shown in FIG. 9. With the filter of FIG. 10, the degree of centralization is rated only with the picture elements, which are located along radial lines extending radially from a picture element of interest in M kinds of directions at 2π/M degree intervals. (In FIG. 10, by way of example, 32 directions at 11.25 degree intervals are shown.)

In cases where the picture element of interest has the coordinates (k, 1), the coordinates ([x], [y]) of the picture element, which is located along an i'th radial line and is the n'th picture element as counted from the picture element of interest, are given by Formulas (3) and (4) shown below.

x=k+n cos {2π(i−1)/M} (3)

y=1+n sin {2π(i−1)/M} (4)

wherein [x] represents the maximum integer, which does not exceed x, and [y] represents the maximum integer, which does not exceed y.

Also, for each of the radial lines, the output value obtained for the picture elements ranging from a certain picture element to a picture element, which is located along the radial line and at which the maximum degree of centralization is obtained, is taken as the degree of centralization Cimax with respect to the direction of the radial line. The mean value of the degrees of centralization Cimax, which have been obtained for all of the radial lines, is then calculated. The mean value of the degrees of centralization Cimax having thus been calculated is taken as the degree of centralization C of the gradient vector group with respect to the picture element of interest.

Specifically, the degree of centralization Ci(n), which is obtained for the picture elements ranging from the picture element of interest to the n'th picture element located along the i'th radial line, is calculated with Formula (5) shown below.

$$Ci(n) = \sum_{i=1}^{n} \{(\cos\theta_{ii})/n\}, \; Rmin \leq n \leq Rmax \quad (5)$$

wherein Rmin and Rmax respectively represent the minimum value and the maximum value having been set for the radius of the tumor pattern, which is to be detected.

Specifically, with Formula (5), the degree of centralization Ci(n) is calculated with respect to all of the picture elements, which are located along each of the radial lines and fall within the range from the picture element of interest, that is located on each radial line, to a picture element, that is located at a length of distance falling within the range from a length of distance corresponding to the minimum value Rmin having been set for the radius of the tumor pattern to be detected to a length of distance corresponding to the maximum value Rmax.

Thereafter, the degree of centralization C of the gradient vector group is calculated with Formulas (6) and (7) shown below.

$$Ci_{max} = \max_{Rmin \leq n \leq Rmax} Ci(n) \quad (6)$$

$$C = (1/32) \sum_{i=1}^{32} Ci_{max} \quad (7)$$

The value of Cimax of Formula (6) represents the maximum value of the degree of centralization Ci(n) obtained for each of the radial lines with Formula (5). Therefore, the region from the picture element of interest to the picture element associated with the degree of centralization Ci(n), which takes the maximum value, may be considered as being the region of the prospective tumor pattern along the direction of the radial line.

The calculation with Formula (6) is made for all of the radial lines, and the regions of the prospective tumor pattern on all of the radial lines are thereby detected. The regions of the prospective tumor pattern on the adjacent radial lines are then connected by a straight line or a non-linear curve. In this manner, it is possible to specify the shape of the peripheral edge of the region, which may be regarded as the prospective tumor pattern.

Thereafter, with Formula (7), the mean value of the maximum values Cimax of the degrees of centralization within the aforesaid regions, which maximum values Cimax have been given by Formula (6) for all directions of the radial lines, is calculated. In Formula (7), by way of example, the radial lines are set along 32 directions. The calculated mean value serves as an output value I of the iris filter processing. The output value is compared with a predetermined constant threshold value T, which is appropriate for making a judgment as to whether the detected pattern is or is not a prospective tumor pattern. In cases where I≧T, it is judged that the region having its center at the picture element of interest is a prospective abnormal pattern (a prospective tumor pattern). In cases where I<T, it is judged that the region having its center at the picture element of interest is not a prospective tumor pattern.

The size and the shape of the region, in which the degree of centralization C of the gradient vector group with Formula (7) is rated, change adaptively in accordance with the distribution of the gradient vectors. Such an adaptive change is similar to the manner, in which the iris of the human's eye expands or contracts in accordance with the brightness of the external field. Therefore, the aforesaid technique for detecting the region of the prospective tumor pattern by utilizing the degrees of centralization of the gradient vectors is referred to as the iris filter processing.

The calculation of the degree of centralization Ci(n) may be carried out by using Formula (5') shown below in lieu of Formula (5).

$$Ci(n) = \frac{1}{n - R\min + 1} \sum_{l=R\min}^{n} \cos\theta_{ij}, R\min \le n \le R\max \quad (5')$$

Specifically, with Formula (5'), the degree of centralization Ci (n) is calculated with respect to all of the picture elements, which are located along each of the radial lines and fall within the range from a picture element, that is located at a length of distance corresponding to the minimum value Rmin having been set for the radius of the tumor pattern to be detected, the length of distance being taken from the picture element of interest located on each radial line, to a picture element, that is located at a length of distance falling within the range from the length of distance corresponding to the minimum value Rmin to a length of distance corresponding to the maximum value Rmax, the length of distance being taken from the picture element of interest located on each radial line.

By carrying out the steps described above, the iris filter can efficiently detect only the tumor pattern, which has a desired size, from a radiation image. Research has heretofore been carried out on the iris filter particularly for the purpose of detecting a cancerous portion from a mammogram.

Radiation images are often recorded such that a pattern, such as a mammary gland pattern, which is not an abnormal pattern, quantum noise, or the like, is superposed upon an abnormal pattern. In such cases, the direction of the image density gradient vector deviates from the center point of the abnormal pattern, and the degree of centralization of the image density gradient vector becomes lower than the degree of centralization in an image, in which a pattern other than an abnormal pattern, quantum noise, or the like, is not superposed upon the abnormal pattern. Therefore, the output value I of the iris filter processing becomes small, and there is the risk that the output value I becomes smaller than a predetermined threshold value and the abnormal pattern is not detected as the prospective abnormal pattern.

Also, the output value I of the iris filter processing takes a large value for an abnormal pattern, which has a contour shape close to a true circle. However, all abnormal patterns do not necessarily have a contour shape close to a true circle, and there are abnormal patterns having slightly uneven contour shapes. As for such a distorted abnormal pattern, the output value I of the iris filter processing becomes small. Therefore, as in the aforesaid cases where noise is superposed upon the abnormal pattern, there is the risk that the distorted abnormal pattern is not detected as the prospective abnormal pattern.

However, if the aforesaid threshold value is merely set to be small such that the prospective abnormal pattern, which is to be detected, can be detected, the problems will occur in that a false positive (FP), such as a nipple pattern, which is actually not the abnormal pattern, is detected as the prospective abnormal pattern. In such cases, considerable time and labor will be required for a person who views the radiation image, such as a medical doctor, to make a judgment.

FIG. 3A shows a radiation image (a negative image recorded on photographic film) P, in which a pattern P0 of the mamma serving as an object is embedded. By way of example, the iris filter processing may be carried out on the radiation image P. In such cases, as illustrated in FIG. 3B and 3C, an output value I1 is obtained for a tumor pattern P1, and an output value I2 (=0) is obtained for a mammary gland pattern P2. Also, an output value I3 is obtained for a pattern P3, at which a mammary gland pattern and a blood vessel pattern intersect each other, and an output value I4 is obtained for a nipple pattern P4.

For example, if quantum noise is superposed upon the tumor pattern P1, the output value I1 for the tumor pattern P1 will become small and approximately equal to the output value I4 for the nipple pattern P4. In such cases, if the threshold value is set to be a large value, T2, the tumor pattern P1 cannot be detected. If the threshold value is set to be a small value, T1, the tumor pattern P1 can be detected, but the nipple pattern P4, which is not a tumor pattern, will also be detected.

SUMMARY OF THE INVENTION

The primary object of the present invention is to provide a method of detecting a prospective abnormal pattern, wherein a prospective abnormal pattern is detected accurately such that considerable time and labor may not be required for a person, who views a radiation image, to make a judgment.

Another object of the present invention is to provide an apparatus for carrying out the method of detecting a prospective abnormal pattern.

The objects are accomplished by methods and apparatuses for detecting a prospective abnormal pattern in accordance with the present invention, which utilize the characteristics such that the image density value of a prospective abnormal pattern, such as a prospective tumor pattern, is smaller than the image density values of the surrounding image portions. In the methods and apparatuses for detecting a prospective abnormal pattern in accordance with the present invention, a threshold value, which is to be compared with an output value I of iris filter processing, is varied depending upon the image signal value, or the output value of the iris filter processing is varied depending upon the image signal value. Erroneous detection of a false positive is thereby restricted, and a prospective abnormal pattern is detected accurately.

Specifically, the present invention provides a first method of detecting a prospective abnormal pattern, comprising the steps of:

i) carrying out iris filter processing on an image signal, which has been obtained by reading out a radiation image of an object, ii) comparing an output value of the iris filter processing and a predetermined threshold value with each other, and iii) extracting a prospective abnormal pattern, which is embedded in the radiation image, in accordance with the results of the comparison, wherein the improvement comprises decreasing the threshold value as an image signal value, which represents a picture element subjected to the iris filter processing, becomes small (for example, as illustrated in FIG. 4A), and carrying out the comparison.

The term "image signal" as used herein for the first method of detecting a prospective abnormal pattern in accordance with the present invention means an image signal of a high image signal level for a high image density. In cases where an image signal of a high signal level for a high luminance is to be processed, the term "as an image signal value becomes small" as used herein is equivalent to the term "as a luminance value (a value of an image signal of a high signal level for a high luminance) becomes large". Therefore, in the first method of detecting a prospective abnormal pattern in accordance with the present invention, in cases where the image signal is of a high signal level for a high luminance, the threshold value is decreased as the image signal value, which represents a picture element subjected to the iris filterprocessing, becomes large (for example, as illustrated in FIG. 4B), and the comparison is carried out.

Also, the term "picture element subjected to iris filter processing" as used herein means the picture element of interest, which is set when the gradient vector is calculated in the iris filter processing.

The present invention also provides a second method of detecting a prospective abnormal pattern, comprising the steps of:

i) carrying out iris filter processing on an image signal, which has been obtained by reading out a radiation image of an object, ii) comparing an output value of the iris filter processing and a predetermined threshold value with each other, and iii) extracting a prospective abnormal pattern, which is embedded in the radiation image, in accordance with the results of the comparison, wherein the improvement comprises increasing the output value as an image signal value, which represents a picture element subjected to the iris filter processing, becomes small, and carrying out the comparison.

In order for the output value of the iris filter processing to be increased, for example, the output value I of the iris filter processing may be multiplied by a signal-dependent coefficient "a", and a value of aXI may be used. As illustrated in FIG. 6A, the signal-dependent coefficient "a" may be set such that it may become large as the image signal value, which represents a picture element subjected to the iris filter processing, becomes small.

The term "image signal" as used herein for the second method of detecting a prospective abnormal pattern in accordance with the present invention means an image signal of a high image signal level for a high image density. In cases where an image signal of a high signal level for a high luminance is to be processed, the term "as an image signal value becomes small" as used herein is equivalent to the term "as a luminance value becomes large". Therefore, in the second method of detecting a prospective abnormal pattern in accordance with the present invention, in cases where the image signal is of a high signal level for a high luminance, the output value of the iris filter processing is increased (or the value of the signal-dependent coefficient "a" illustrated in FIG. 6B is increased) as the image signal value, which represents a picture element subjected to the iris filter processing, becomes large, and the comparison is carried out.

The present invention further provides a first apparatus for detecting a prospective abnormal pattern, comprising:

i) an iris filter processing means for carrying out iris filter processing on an image signal, which has been obtained by reading out a radiation image of an object, and ii) a comparison means for comparing an output value of the iris filter processing means and a predetermined threshold value with each other, a prospective abnormal pattern, which is embedded in the radiation image, being extracted in accordance with the results of the comparison carried out by the comparison means, wherein the improvement comprises the provision of a threshold value varying means for decreasing the threshold value as an image signal value, which represents a picture element subjected to the iris filter processing, becomes small, the comparison means comparing the output value of the iris filter processing means and the threshold value, which has been varied by the threshold value varying means, with each other.

By way of example, the threshold value varying means may vary the threshold value by using a conversion table, in which the image signal value representing a picture element subjected to the iris filter processing and the corresponding threshold value have been set previously such that the threshold value may become small as the image signal value becomes small.

As in the aforesaid first method of detecting a prospective abnormal pattern in accordance with the present invention, the term "image signal" as used herein for the first apparatus for detecting a prospective abnormal pattern in accordance with the present invention means an image signal of a high image signal level for a high image density. In cases where an image signal of a high signal level for a high luminance is to be processed, the term "as an image signal value becomes small" as used herein is equivalent to the term "as a luminance value becomes large". Therefore, in the first apparatus for detecting a prospective abnormal pattern in accordance with the present invention, in cases where the image signal is of a high signal level for a high luminance, the threshold value varying means may decrease the threshold value as the image signal value (the luminance value), which represents a picture element subjected to the iris filter processing, becomes large. For example, as illustrated in FIG. 4B, the threshold value is decreased as the image signal value, which represents a picture element subjected to the iris filter processing, becomes large, and the comparison is carried out.

The present invention still further provides a second apparatus for detecting a prospective abnormal pattern, comprising:

i) an iris filter processing means for carrying out iris filter processing on an image signal, which has been obtained by reading out a radiation image of an object, and ii) a comparison means for comparing an output value of the iris filter processing means and a predetermined threshold value with each other, a prospective abnormal pattern, which is embedded in the radiation image, being extracted in accordance with the results of the comparison carried out by the comparison means, wherein the improvement comprises the provision of an output value varying means for increasing the output value as an image signal value, which represents a picture element subjected to the iris filter processing, becomes small, the comparison means comparing the output value, which has been varied by the output value varying means, and the threshold value with each other.

By way of example, the output value varying means may multiply the output value by a signal-dependent coefficient, which has been set previously in accordance with the image signal value representing a picture element subjected to the iris filter processing such that the coefficient value may become large as the image signal value becomes small.

As in the aforesaid second method of detecting a prospective abnormal pattern in accordance with the present invention, the term "image signal" as used herein for the second apparatus for detecting a prospective abnormal pattern in accordance with the present invention means an image signal of a high image signal level for a high image density. In cases where an image signal of a high signal level for a high luminance is to be processed, the term "as an image signal value becomes small" as used herein is equivalent to the term "as a luminance value becomes large". Therefore, in the second apparatus for detecting a prospective abnormal pattern in accordance with the present invention, in cases where the image signal is of a high signal level for a high luminance, the output value varying means may increase the output value as the image signal value (the luminance value), which represents a picture element subjected to the iris filter processing, becomes large. For example, as illustrated in FIG. 6B, the output value of the iris filter processing is multiplied by the signal-dependent coefficient "a", which has been set such that it may become large as the image signal value, which represents a picture element subjected to the iris filter processing, becomes large. The comparison is then carried out.

With the first method and apparatus for detecting a prospective abnormal pattern in accordance with the present invention, the threshold value, which is to be compared with the output value of the iris filter processing, is decreased as the image signal value, which represents a picture element of interest in the iris filter processing, becomes small. Therefore, the prospective abnormal pattern having the characteristics such that the image signal value of the prospective abnormal pattern is smaller than the image signal values of the surrounding image portions can be detected with a high rate. Also, a false positive, which yields a comparatively small output value of the iris filter processing, and a false positive, which yields a large output value of the iris filter processing but is represented by an image signal value larger than the image signal values of the surrounding image portions, can be prevented from being detected by mistake.

With the second method and apparatus for detecting a prospective abnormal pattern in accordance with the present invention, the threshold value is kept constant regardless of the image signal value, and the output value of the iris filter processing is increased as the image signal value, which represents a picture element of interest in the iris filter processing, becomes small. Therefore, the prospective abnormal pattern having the characteristics such that the image signal value of the prospective abnormal pattern is smaller than the image signal values of the surrounding image portions can be detected with a high rate. Also, a false positive, which yields a comparatively small output value of the iris filter processing, and a false positive, which yields a large output value of the iris filter processing but is represented by an image signal value larger than the image signal values of the surrounding image portions, can be prevented from being detected by mistake.

BRIEF DESCRIPTION OF THE DRAWINGS

FIG. 5 is a schematic block diagram showing an embodiment of the second apparatus for detecting a prospective abnormal pattern in accordance with the present invention, FIG. 8 is an explanatory view showing a mask, which is used for calculating directions of gradient vectors in iris filter processing.

DESCRIPTION OF THE PREFERRED EMBODIMENTS

The present invention will hereinbelow be described in further detail with reference to the accompanying drawings.

Figure 1:
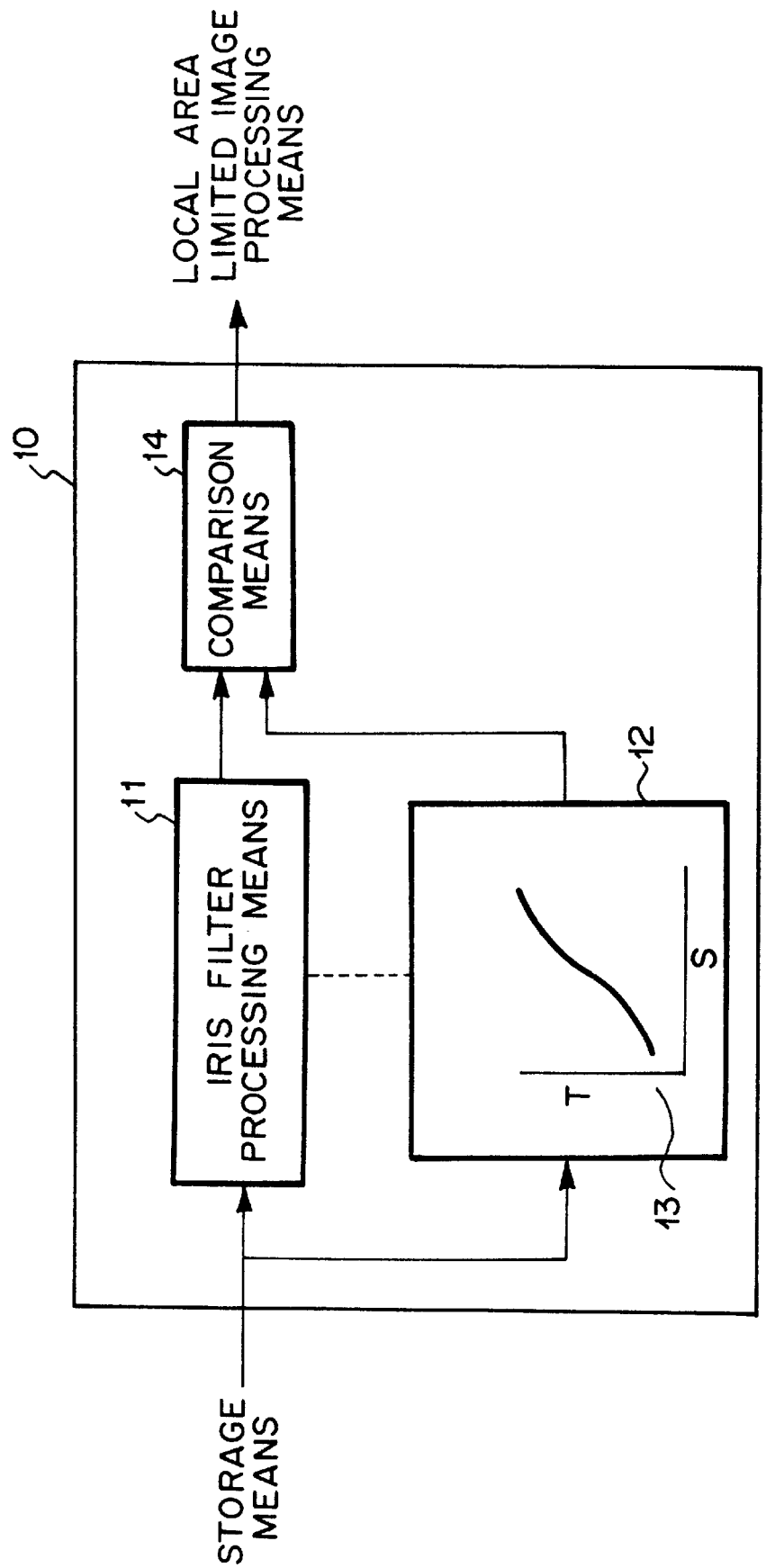
FIG. 1 is a schematic block diagram showing an embodiment of the first apparatus for detecting a prospective abnormal pattern in accordance with the present invention.
Figure 2:
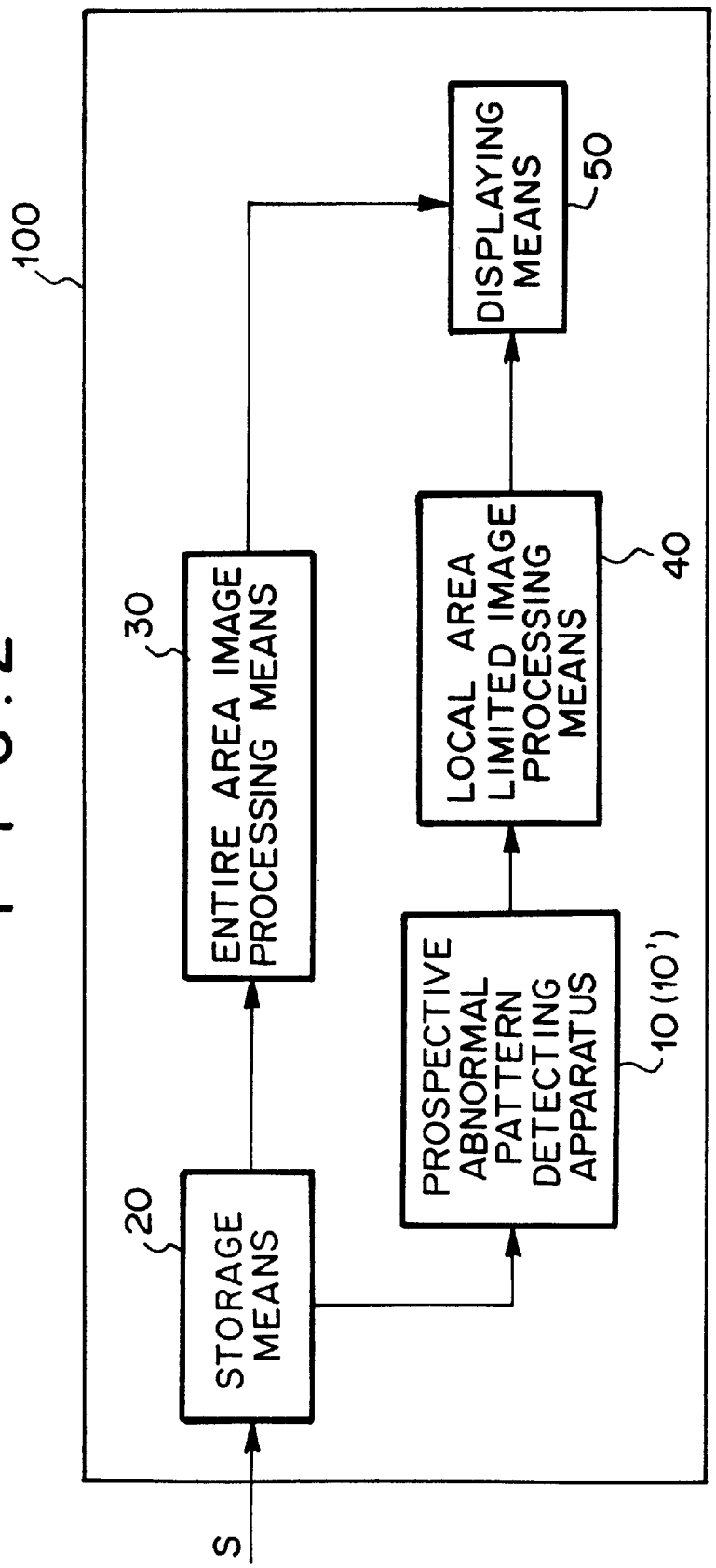
FIG. 2 is a block diagram showing an example of a computer aided medical image diagnosing apparatus, in which the prospective abnormal pattern detecting apparatus of FIG. 1

FIG. 1 is a schematic block diagram showing an embodiment of the first apparatus for detecting a prospective abnormal pattern in accordance with the present invention. FIG. 2 is a block diagram showing an example of a computer aided medical image diagnosing apparatus, in which the prospective abnormal pattern detecting apparatus of FIG. 1 is employed.

With reference to FIG. 2, a computer aided medical image diagnosing apparatus 100 comprises a storage means 20 for storing a received image signal (hereinbelow referred to as the entire area image signal) S, and an entire area image processing means 30 for reading out the entire area image signal S from the storage means 20 and carrying out image processing, such as gradation processing or frequency processing, on the entire area image signal S. The computer aided medical image diagnosing apparatus 100 also comprises a prospective abnormal pattern detecting apparatus 10 for reading out the entire area image signal S from the storage means 20 and extracting an image signal (hereinbelow referred to as the local area limited image signal) Sp, which represents a prospective abnormal pattern (a prospective tumor pattern), from the entire area image signal S. The computer aided medical image diagnosing apparatus 100 further comprises a local area limited image processing means 40 for carrying out emphasis processing on the extracted local area limited image signal Sp in order to emphasize the extracted prospective abnormal pattern. The computer aided medical image diagnosing apparatus 100 still further comprises a displaying means 50 for displaying the entire area image, which has been obtained from the image processing carried out by the entire area image processing means 30, and the prospective abnormal pattern, which has been obtained from the image processing carried out by the local area limited image processing means 40, as a visible image.

Figure 3A:
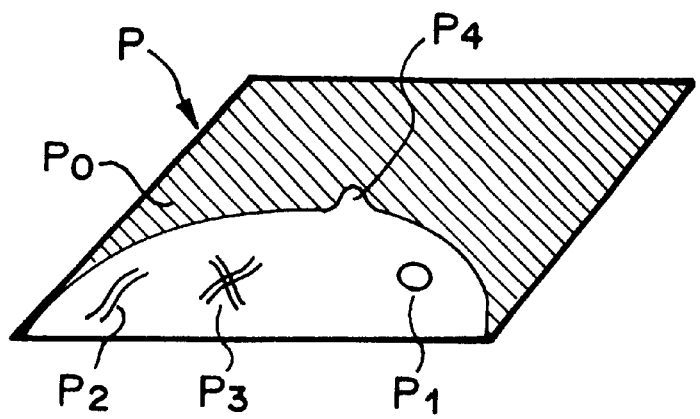
FIG. 3A is an explanatory view showing an image (a mammogram) to be processed by the computer aided medical image diagnosing apparatus of FIG. 2, FIGS. 3B and 3C are explanatory views showing output values, which are obtained from iris filter processing carried out on the image shown in FIG. 3A, and a threshold value T.

By way of example, as illustrated in FIG. 3A, an image P, which represents a mammogram of a patient, is stored on a stimulable phosphor sheet. The stimulable phosphor sheet, on which the image P representing the mammogram has been stored, is then exposed to stimulating rays, which cause the stimulable phosphor sheet to emit light in proportion to the amount of energy stored thereon during its exposure to radiation. The emitted light is photoelectrically detected, and the thus obtained image signal is converted into a digital image signal. The digital image signal (the image signal of a high image signal level for a high image density) is fed as the entire area image signal S into the computer aided medical image diagnosing apparatus 100.

With the displaying means 50, the entire area image and the prospective abnormal pattern may be independently displayed on the displaying screen. However, in this embodiment, the entire area image is displayed, and the image portion corresponding to the prospective abnormal pattern in the entire area image is replaced by the prospective abnormal pattern, which has been obtained from the image processing carried out by the local area limited image processing means 40.

As illustrated in FIG. 1 in detail, the prospective abnormal pattern detecting apparatus 10 comprises an iris filter processing means 11, a threshold value varying means 12, and a comparison means 14. The iris filter processing means 11 carries out the iris filter processing on the entire area image signal S. The threshold value varying means 12 receives the entire area image signal S and feeds out information representing a threshold value T, which is to be compared with an output value I of the iris filter processing and depends upon the entire area image signal S. The comparison means 14 compares the output value I of the iris filter processing and the threshold value T, which has been fed out from the threshold value varying means 12, with each other. In cases where (output value I)≧(threshold value T), the comparison means 14 feeds out all of the image signal components falling within the region of the prospective abnormal pattern, in which the picture element yielding the output value I is taken as the picture element of interest in the iris filter processing. In cases where (output value I)<(threshold value T), the comparison means 14 does not feed out the image signal.

Figure 4A:
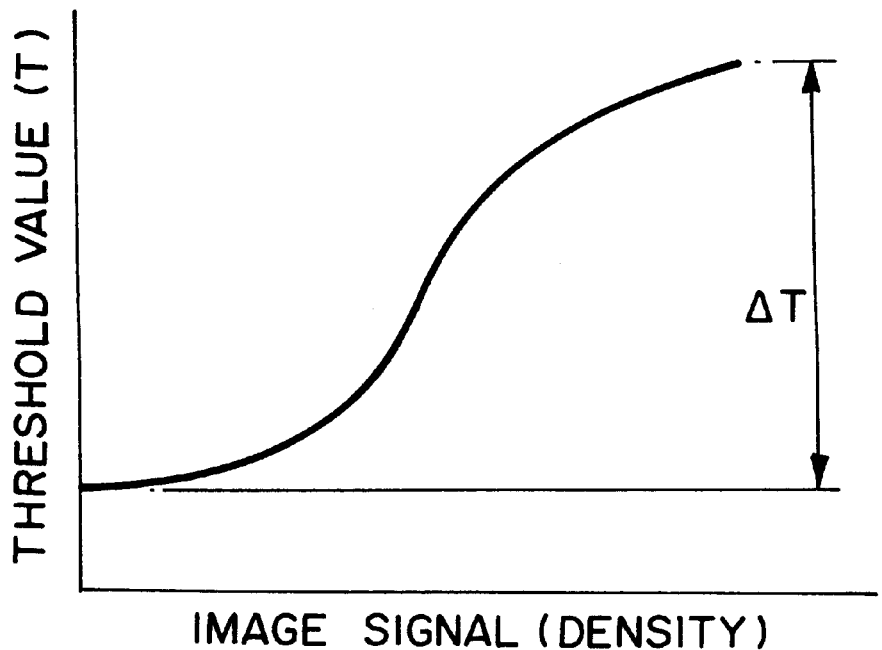
FIG. 4A is a graph showing a conversion table, in which a threshold value T is set in accordance with an image signal S, the conversion table being set for an image signal of a high image signal level for a high image density.

The threshold value varying means 12 is provided with a conversion table 13. As illustrated in FIG. 4A, in the conversion table 13, the value of the entire area image signal S and the corresponding threshold value T have been set previously such that the threshold value T may become small as the image signal value S becomes small. From the threshold value varying means 12, the threshold value corresponding to the image signal value representing the picture element, which is being processed as the picture element of interest by the iris filter processing means 11, is fed out in synchronization with the output from the iris filter processing means 11.

How the prospective abnormal pattern detecting apparatus 10 operates will be described hereinbelow.

The entire area image signal S, which has been fed from the storage means 20 into the prospective abnormal pattern detecting apparatus 10, is fed into the iris filter processing means 11 and the threshold value varying means 12.

In the iris filter processing means 11, each of the picture elements, which are represented by the entire area image signal S, is taken as the picture element of interest, and the maximum value Cimax of the degree of centralization of the image density gradient vector is calculated with Formula (6). Thereafter, with Formula (7), the mean value of the maximum values Cimax of the degrees of centralization, which maximum values Cimax have been given by Formula (6) for all directions of radial lines extending from the picture element of interest, is calculated. The thus obtained mean value is taken as the output value I of the iris filter processing means 11, and the information representing the output value I is fed into the comparison means 14.

$$Ci_{max} = \max_{Rmin \leq n \leq Rmax} Ci(n) \tag{6}$$

$$C = (1/32) \sum_{i=1}^{32} Ci_{max} \tag{7}$$

The threshold value varying means 12 feeds out the information representing the threshold value T, which corresponds to the value of the received entire area image signal S, in accordance with conversion table 13. The thus outputted threshold value T is the one that corresponds to the image signal value representing the picture element, which is being processed as the picture element of interest by the iris filter processing means 11. The information representing the threshold value T is fed from the threshold value varying means 12 into the comparison means 14.

Thereafter, for each picture element of interest, the comparison means 14 compares the output value I of the iris filter processing and the threshold value T, which has been received from the threshold value varying means 12, with each other.

In cases where (output value I)≧(threshold value T) as a result of the comparison, the comparison means 14 feeds out all of the image signal components of the entire area image signal S falling within the region of the prospective abnormal pattern, in which the picture element yielding the output value I is taken as the picture element of interest in the iris filter processing. In cases where (output value I)<(threshold value T), the comparison means 14 does not feed out the image signal.

In this manner, only the local area limited image signal Sp, which corresponds to the image portion having yielded the output value I not smaller than the threshold value T, is fed from the comparison means 14 into the local area limited image processing means 40.

Figure 3B:
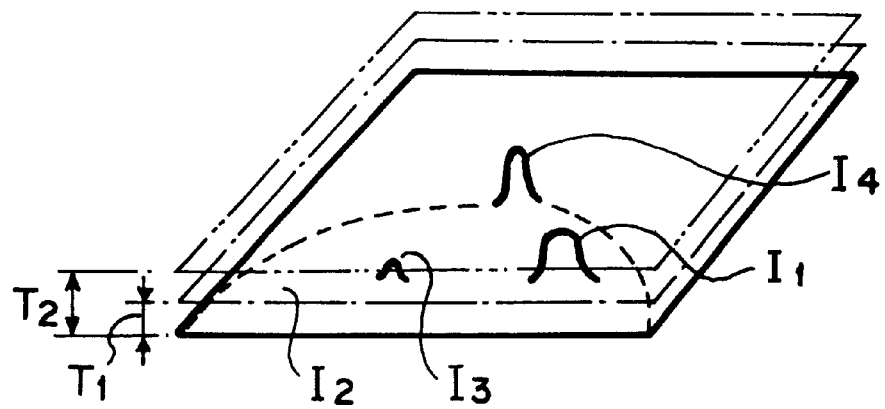
Figure 3C:
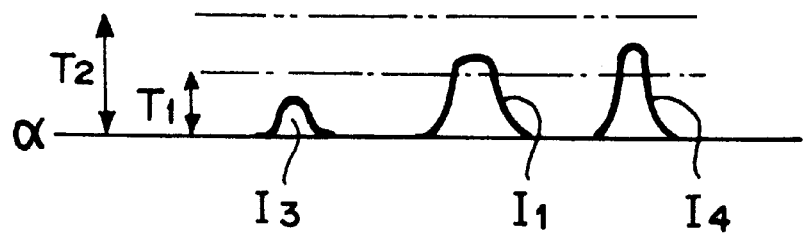

The series of operations described above will be described hereinbelow with respect to the image P representing the mammogram, which is shown in FIG. 3A. The iris filter processing may be carried out on the image P representing the mammogram. In such cases, as illustrated in FIG. 3B and 3C, the output value I1 is obtained for the tumor pattern P1, and the output value I2 (=0) is obtained for the mammary gland pattern P2. Also, the output value I3 is obtained for the pattern P3, at which a mammary gland pattern and a blood vessel pattern intersect each other, and the output value I4 is obtained for the nipple pattern P4. The output value I1 corresponding to the tumor pattern P1 alone should take a value larger than the illustrated output value I. However, if quantum noise is superposed upon the tumor pattern P1, the degree of centralization of the image density gradient vector upon the picture element of interest will become low. As a result, the output value I1 corresponding to the tumor pattern P1 takes the illustrated comparatively small value, which is approximately equal to the output value I4 for the nipple pattern P4.

In such cases, if the threshold value is set to be a large value, T2 (constant), the tumor pattern P1 cannot be detected. If the threshold value is set to be a small value, T1 (constant), the tumor pattern P1 can be detected, but the nipple pattern P4, which is not a tumor pattern, will also be detected.

However, in the prospective abnormal pattern detecting apparatus 10 of this embodiment, the threshold value T is varied by the threshold value varying means 12 in accordance with the image signal value S representing the picture element of interest. Therefore, as for the tumor pattern P1, which is located in the region having a small image signal value, the threshold value is set to be small. On the other hand, as for the nipple pattern P4, which is located in the region having a large image signal value, the threshold value is set to be large.

Accordingly, when the output value I for the tumor pattern P1 and the threshold value are compared with each other by the comparison means 14, it is found that (output value I)≧(threshold value T). In such cases, an image signal S1 representing the tumor pattern P1 is fed into the local area limited image processing means 40. However, when the output value I4 for the nipple pattern P4 and the threshold value are compared with each other by the comparison means 14, it is found that (output value I)<(threshold value T). In such cases, an image signal S4 representing the nipple pattern P4 is not fed into the local area limited image processing means 40. In this manner, the prospective abnormal pattern can be extracted accurately, and the nipple pattern and the mammary gland pattern, which are false positives, can be prevented from being detected by mistake.

The image signal representing the prospective tumor pattern, which has thus been extracted accurately by the prospective abnormal pattern detecting apparatus 10, is fed into the local area limited image processing means 40. In the local area limited image processing means 40, the received image signal is subjected to emphasis processing for emphasizing the prospective tumor pattern. The image signal having been obtained from the emphasis processing is fed into the displaying means 50.

Also, in the entire area image processing means 30, image processing, such as gradation processing or frequency processing, for obtaining an entire area image having good image quality is carried out on the entire area image signal S. The entire area image signal S having been obtained from the image processing is fed from the entire area image processing means 30 into the displaying means 50. On the displaying means 50, the entire area image, which is represented by the entire area image signal S, is displayed, such that the image portion corresponding to the prospective abnormal pattern in the entire area image may be replaced by the prospective abnormal pattern, which has been obtained from the image processing carried out by the local area limited image processing means 40. The displayed visible image is used by a person, who views the radiation image, such as a medical doctor, in making a diagnosis of an abnormal pattern.

Such that the threshold value may be prevented from varying sharply due to a slight variation in image signal value, it is not desirable that a variation width ΔT of the threshold value is set to be large with respect to the dynamic range of the image signal value.

Therefore, a direct current component k·Δα, which is variable with a predetermined step amount Δα larger than the variation width ΔT of the threshold value, should preferably be added to the aforesaid threshold value T, and the thus obtained sum should preferably be employed as a new threshold value Th. Specifically, the new threshold value Th is defined by the formula shown below.

Th=T+k·Δα where k represents 0 or a natural number.

As for the direct current component k·Δα, the value of k may be altered successively by the comparison means 14, and an appropriate threshold value reference k·Δα may be calculated.

Figure 4B:
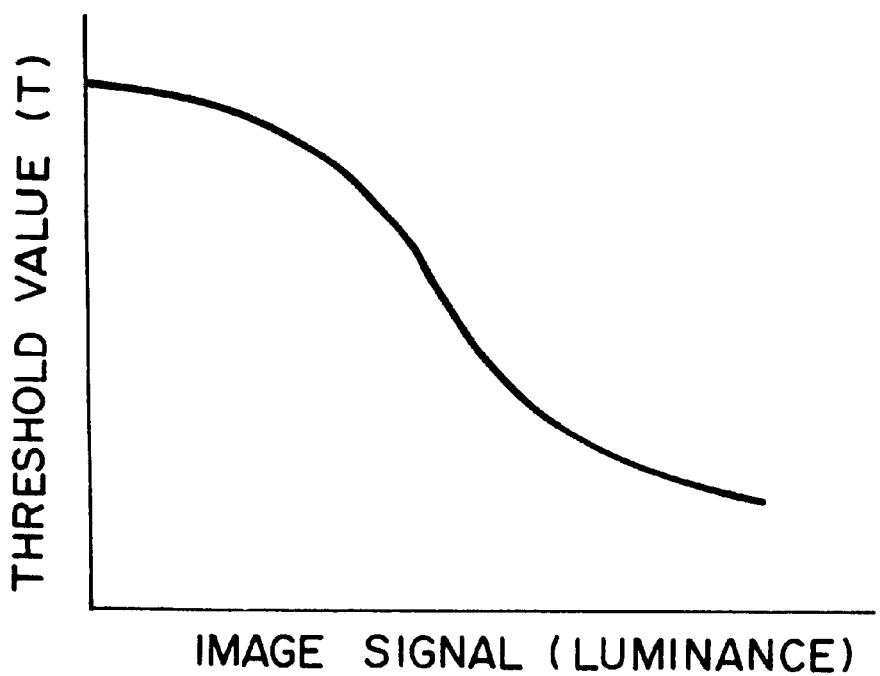
FIG. 4B is a graph showing a conversion table, in which a threshold value T is set in accordance with an image signal S, the conversion table being set for an image signal of a high signal level for a high luminance.

The pattern of the conversion table 13, which is stored in the threshold value varying means 12, is not limited to that illustrated in FIG. 4A. In cases where the image signal to be processed is an image signal of a high signal level for a high luminance, in lieu of the conversion table illustrated in FIG. 4A, a conversion table illustrated in FIG. 4B may be employed, in which the value of the entire area image signal S and the corresponding threshold value T have been set previously such that the threshold value T may become small as the image signal value S becomes large.

Figure 5:
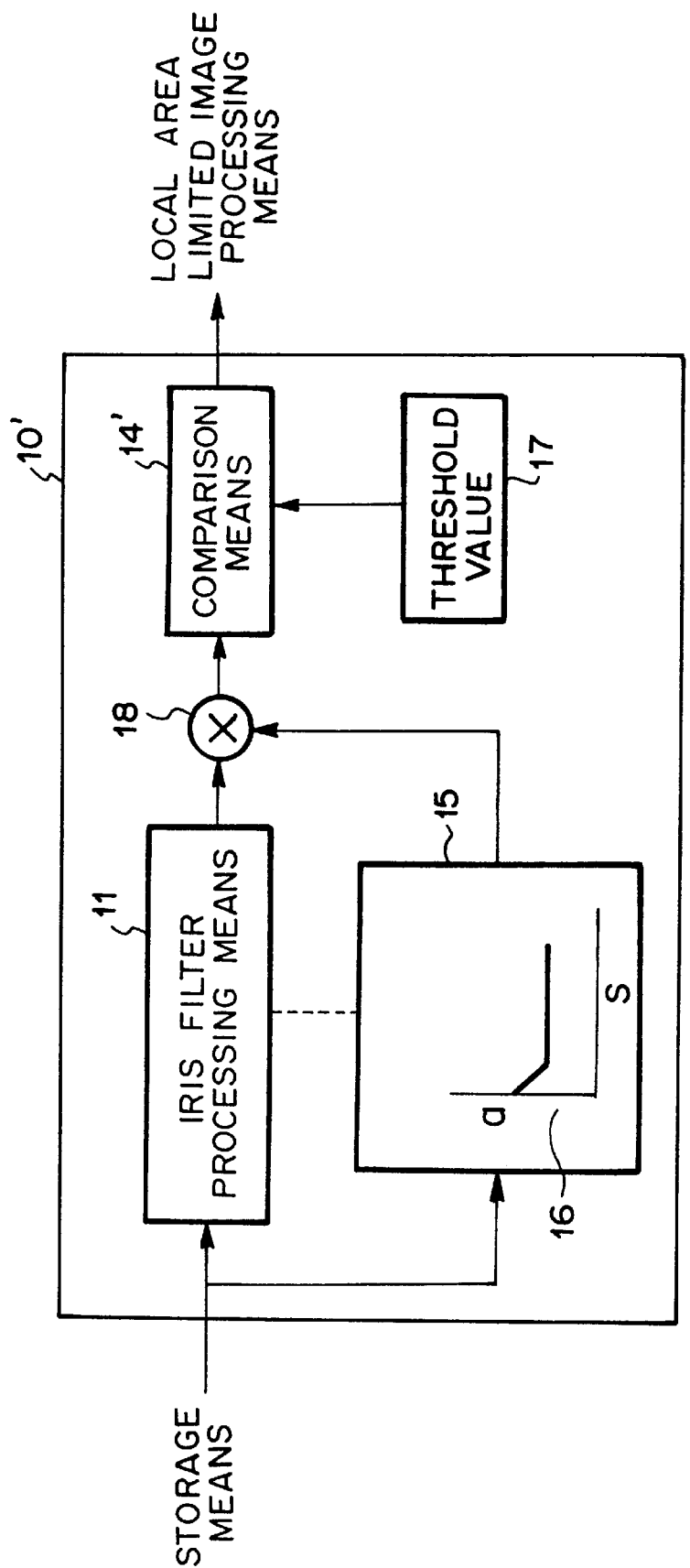
FIG. 5 is employed.

FIG. 5 is a schematic block diagram showing an embodiment of the second apparatus for detecting a prospective abnormal pattern in accordance with the present invention.

As in the prospective abnormal pattern detecting apparatus 10 of FIG. 1, a prospective abnormal pattern detecting apparatus 10' illustrated in FIG. 5 may be employed in the computer aided medical image diagnosing apparatus 100 shown in FIG. 2.

The prospective abnormal pattern detecting apparatus 10' comprises the iris filter processing means 11, an output value varying means 15, a multiplier 18, and a comparison means 14'. The iris filter processing means 11 carries out the iris filter processing on the entire area image signal S. The output value varying means 15 receives the entire area image signal S and feeds out information representing a signal-dependent coefficient "a", by which the output value I of the iris filter processing is to be multiplied and which depends upon the entire area image signal S. The multiplier 18 multiplies the output value I of the iris filter processing by the signal-dependent coefficient "a". The comparison means 14' compares the product, which is obtained from the multiplication of the output value I of the iris filter processing by the signal-dependent coefficient "a", and the constant threshold value T, which is stored in a storage means 17, with each other. In cases where a·I≧T, the comparison means 14' feeds out all of the image signal components falling within the region of the prospective abnormal pattern, in which the picture element yielding the output value I is taken as the picture element of interest in the iris filter processing. In cases where a·I<T, the comparison means 14' does not feed out the image signal.

Figure 6A:
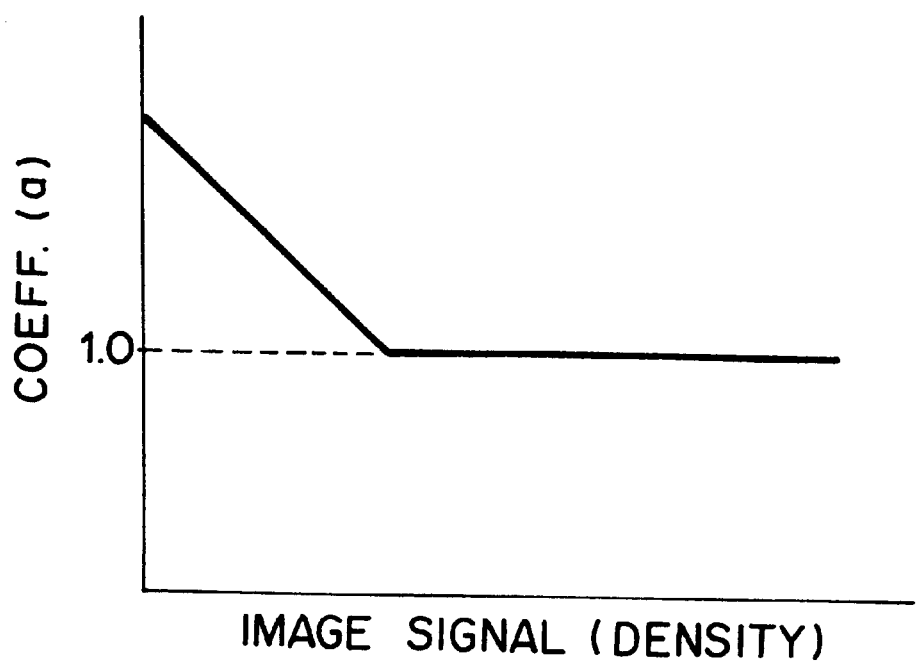
FIG. 6A is a graph showing a conversion table, in which a signal-dependent coefficient "a" is set in accordance with an image signal S, the conversion table being set for an image signal of a high image signal level for a high image density.

The output value varying means 15 is provided with a conversion table 16. As illustrated in FIG. 6A, in the conversion table 16, the value of the entire area image signal S and the corresponding signal-dependent coefficient "a" have been set previously such that the signal-dependent coefficient "a" may become large as the image signal value S becomes small. From the output value varying means 15, the signal-dependent coefficient corresponding to the image signal value representing the picture element, which is being processed as the picture element of interest by the iris filter processing means 11, is fed out in synchronization with the output from the iris filter processing means 11.

How the prospective abnormal pattern detecting apparatus 10' operates will be described hereinbelow.

The entire area image signal S, which has been fed from the storage means 20 illustrated in FIG. 2 into the prospective abnormal pattern detecting apparatus 10', is fed into the iris filter processing means 11 and the output value varying means 15.

The iris filter processing means 11 operates in the same manner as that in the aforesaid embodiment of the first apparatus for detecting a prospective abnormal pattern in accordance with the present invention.

The output value varying means 15 feeds out the information representing the signal-dependent coefficient "a", which corresponds to the value of the received entire area image signal S, in accordance with conversion table 16. The thus outputted signal-dependent coefficient "a" is the one that corresponds to the image signal value representing the picture element, which is being processed as the picture element of interest by the iris filter processing means 11. The information representing the signal-dependent coefficient "a" is fed from the output value varying means 15 into the multiplier 18 in synchronization with the output value I fed from the iris filter processing means 11. The multiplier 18 multiplies the output value I by the corresponding signal-dependent coefficient "a". Information representing the thus obtained product a·I is fed into the comparison means 14'.

The comparison means 14' reads the information representing the threshold value T from the storage means 17. Thereafter, for each picture element of interest, the comparison means 14' compares the received product a·I and the threshold value T with each other.

In cases where (product a·I)≧(threshold value T) as a result of the comparison, the comparison means 14' feeds out all of the image signal components of the entire area image signal S falling within the region of the prospective abnormal pattern, in which the picture element yielding the output value I is taken as the picture element of interest in the iris filter processing. In cases where (product a·I)<(threshold value T), the comparison means 14' does not feed out the image signal.

In this manner, only the local area limited image signal Sp, which corresponds to the image portion having yielded the output value I not smaller than the threshold value T, is fed from the comparison means 14' into the local area limited image processing means 40, which is illustrated in FIG. 2.

The prospective abnormal pattern detecting apparatus 10' illustrated in FIG. 5 is different from the prospective abnormal pattern detecting apparatus 10 illustrated in FIG. 1 in that, in lieu of the threshold value being varied depending upon the image signal, the output value of the iris filter processing is varied depending upon the image signal. However, the difference leads to the same results in the comparison of the output value and the threshold value. Therefore, with the prospective abnormal pattern detecting apparatus 10' illustrated in FIG. 5 has the same effects as those of the prospective abnormal pattern detecting apparatus 10 illustrated in FIG. 1.

Figure 6B:
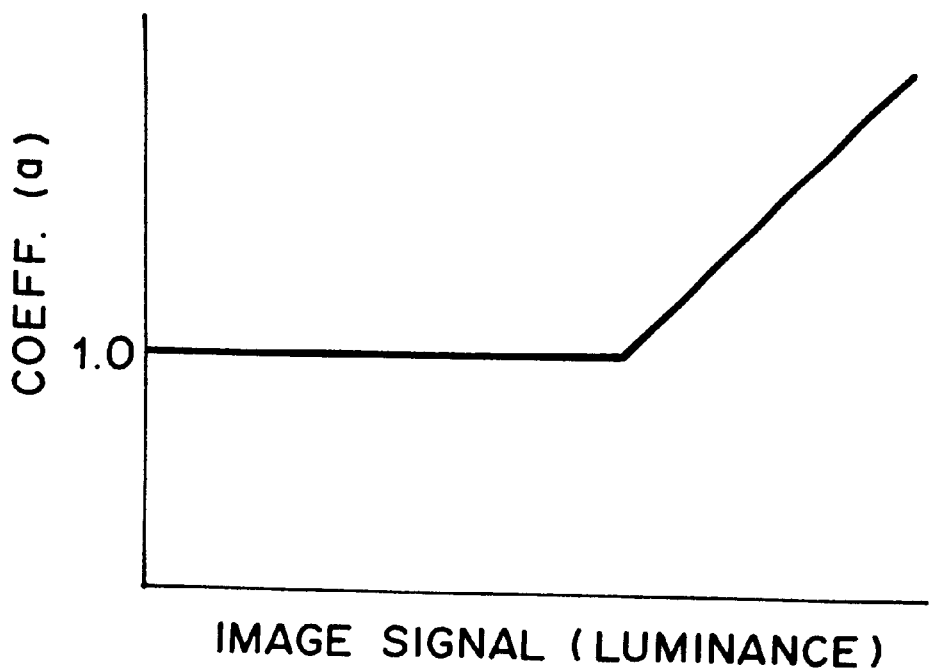
FIG. 6B is a graph showing a conversion table, in which a signal-dependent coefficient "a" is set in accordance with an image signal S, the conversion table being set for an image signal of a high signal level for a high luminance.
Figure 7A:
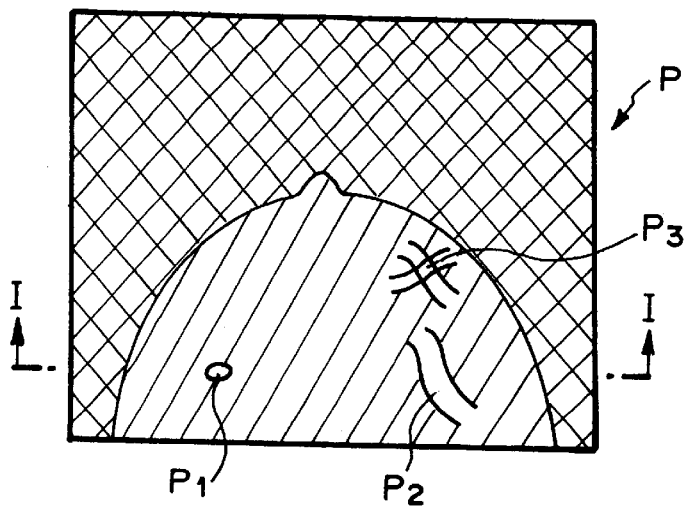
FIG. 7A is an explanatory view showing a radiation image of the mamma (i.e., a mammogram)
Figure 7B:
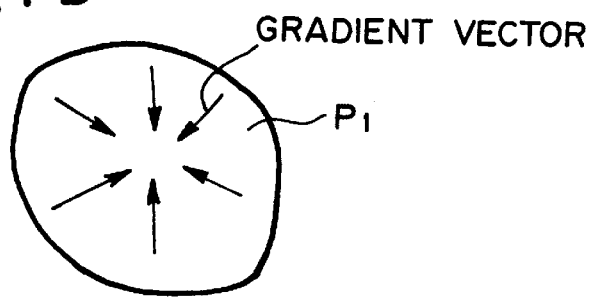
FIG. 7B is an explanatory view showing the degree of centralization of gradient vectors in a tumor pattern.
Figure 7C:
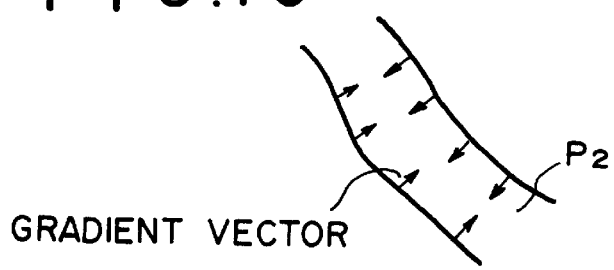
FIG. 7C is an explanatory view showing the degree of centralization of gradient vectors in an elongated pattern, such as a blood vessel pattern or a mammary gland pattern.
Figure 7D:
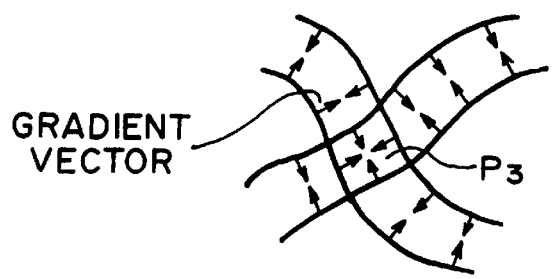
FIG. 7D is an explanatory view showing the degree of centralization of gradient vectors in a portion at which two elongated patterns, such as mammary gland patterns, intersect each other.
Figure 9:
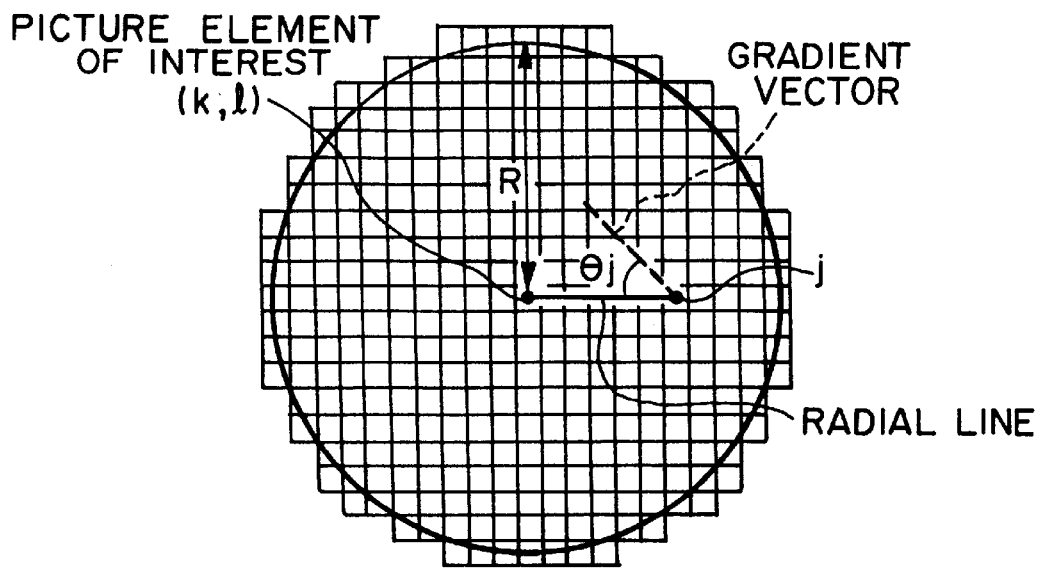
FIG. 9 is an explanatory view showing the concept behind the degree of centralization of a gradient vector with respect to a picture element of interest.
Figure 10:
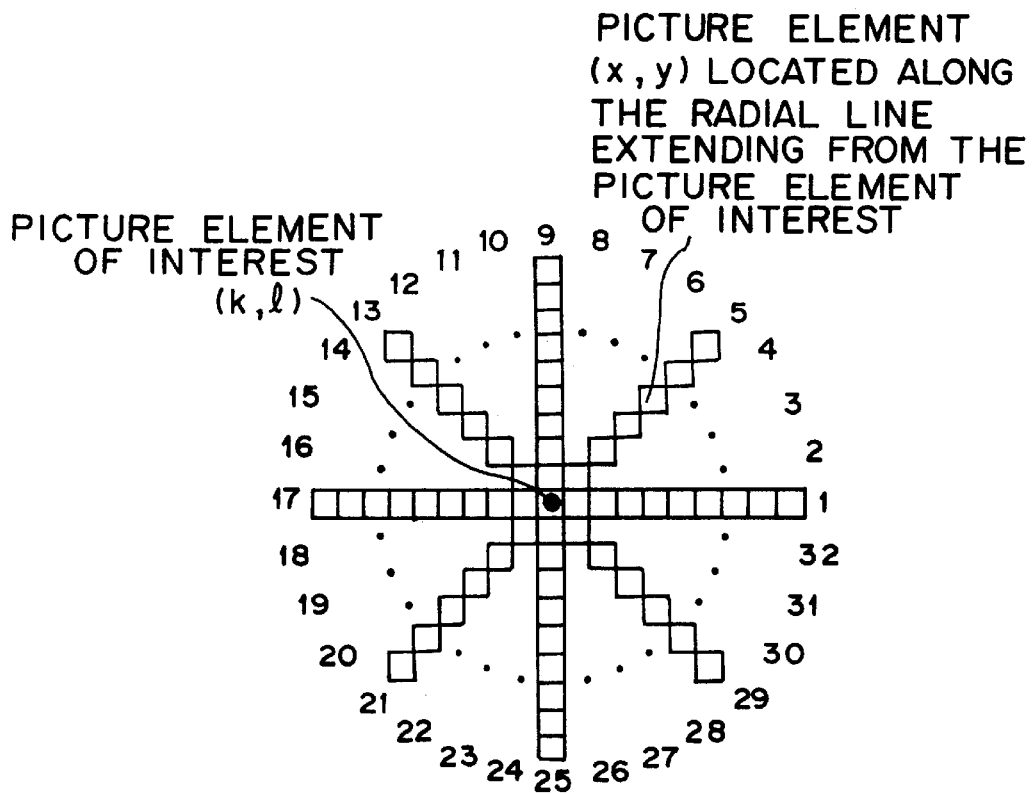
FIG. 10 is an explanatory view showing the concept behind an iris filter, which is set such that a contour shape may change adaptively.

The pattern of the conversion table 16, which is stored in the output value varying means 15, is not limited to that illustrated in FIG. 6A. In cases where the image signal to be processed is an image signal of a high signal level for a high luminance, in lieu of the conversion table illustrated in FIG. 6A, a conversion table illustrated in FIG. 6B may be employed, in which the value of the entire area image signal S and the corresponding signal-dependent coefficient "a" have been set previously such that the signal-dependent coefficient "a" may become large as the image signal value S becomes large.

In the aforesaid embodiments of the first and second apparatuses for detecting a prospective abnormal pattern in accordance with the present invention, the mammogram is processed. However, the methods and apparatuses for detecting a prospective abnormal pattern in accordance with the present invention are also applicable when images other than the mammogram are processed.

What is claimed is:

1. A method of detecting a prospective abnormal pattern, comprising the steps of:
    i) carrying out iris filter processing on image signal values obtained by reading out a radiation image of an object, to produce an iris filter output;
    ii) comparing said iris filter output with a threshold value; and
    iii) extracting a prospective abnormal pattern, which is embedded in the radiation image, in accordance with the results of the comparison;
        further comprising the step of decreasing said threshold value in response to a decrease in said image signal values.

2. A method of detecting a prospective abnormal pattern, comprising the steps of:
    i) carrying out iris filter processing on image signal values obtained by reading out a radiation image of an object, to produce an iris filter output;
    ii) comparing said iris filter output with a threshold value; and
    iii) extracting a prospective abnormal pattern, which is embedded in the radiation image, in accordance with the results of the comparison;

further comprising the step of increasing said iris filter output in response to a decrease in said image signal values.

3. An apparatus for detecting a prospective abnormal pattern, comprising:

i) an iris filter processing means for carrying out iris filter processing on image signal values obtained by reading out a radiation image of an object, to produce an iris filter output;

ii) a comparison means for comparing said iris filter output with a threshold value;

wherein a prospective abnormal pattern, which is embedded in the radiation image, is extracted in accordance with results of a comparison carried out by the comparison means;

further comprising a threshold value varying means for decreasing said threshold value in response to a decrease in said image signal values.

4. An apparatus as defined in claim 3 wherein said threshold value varying means varies the threshold value by using a conversion table, in which the image signal value representing a picture element subjected to the iris filter processing and a corresponding threshold value have been set previously such that the threshold value may become small as said image signal value becomes small.

5. An apparatus for detecting a prospective abnormal pattern, comprising:

i) an iris filter processing means for carrying out iris filter processing on image signal values obtained by reading out a radiation image of an object, to produce an iris filter output;

ii) a comparison means for comparing said iris filter output with a threshold value;

wherein a prospective abnormal pattern, which is embedded in the radiation image, is extracted in accordance with the results of a comparison carried out by the comparison means;

further comprising an output value varying means for increasing said iris filter output in response to a decrease in said image signal values.

6. An apparatus as defined in claim 5 wherein said output value varying means multiplies the output value by a signal-dependent coefficient, which has been set previously in accordance with the image signal value representing a picture element subjected to the iris filter processing such that a value of the signal-dependent coefficient may become large as said image signal value becomes small.

* * * * *